(12) United States Patent
Furbeck et al.

(10) Patent No.: US 9,351,194 B2
(45) Date of Patent: *May 24, 2016

(54) CONGESTION LEVEL INDICATION WITH EXPLICIT CONGESTION NOTIFICATION IN COMMUNICATION SYSTEMS

(71) Applicant: BlackBerry Limited, Waterloo (CA)

(72) Inventors: David Furbeck, Irving, TX (US); Xiaoming Zhao, Plano, TX (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/206,909

(22) Filed: Mar. 12, 2014

(65) Prior Publication Data

US 2014/0247722 A1    Sep. 4, 2014

Related U.S. Application Data

(63) Continuation of application No. 12/685,636, filed on Jan. 11, 2010, now Pat. No. 8,693,320.

(51) Int. Cl.
*H04L 12/26* (2006.01)
*H04W 28/02* (2009.01)
(Continued)

(52) U.S. Cl.
CPC .......... *H04W 28/0289* (2013.01); *H04L 47/10* (2013.01); *H04L 47/12* (2013.01);
(Continued)

(58) Field of Classification Search
CPC ......... H04L 47/10; H04L 47/11; H04L 47/12; H04L 47/33; H04L 47/35; H04L 47/38

USPC .............. 370/310, 229–232, 235, 241, 242, 370/248–250, 351
See application file for complete search history.

(56) References Cited

U.S. PATENT DOCUMENTS

| 8,693,320 B2 | 4/2014 | Furbeck et al. |
| 2003/0012138 A1 | 1/2003 | Abdelilah et al. |

(Continued)

FOREIGN PATENT DOCUMENTS

| CN | 101116293 A | 1/2008 |
| CN | 101253729 A | 8/2008 |

(Continued)

OTHER PUBLICATIONS

Chinese Office Action; Application No. 201180013493.7; Jul. 28, 2014; 15 pages.

(Continued)

*Primary Examiner* — Dmitry H Levitan

(74) *Attorney, Agent, or Firm* — Conley Rose, P.C.; J. Robert Brown, Jr.

(57) ABSTRACT

A method, apparatus, and computer program product for indicating and responding to various congestion levels in a communication system, such as a wireless communication network. A congestion level in the network is determined, and a percentage of data packets to be transmitted to an endpoint, such as user equipment or another network endpoint serving the user, are marked to indicate the congestion level. The endpoint determines the congestion level at the network from the percentage of received data packets that are marked and may initiate an appropriate response behavior in response to the determined congestion level.

20 Claims, 11 Drawing Sheets

(51) Int. Cl.
*H04L 12/801* (2013.01)
*H04L 12/825* (2013.01)
*H04W 28/22* (2009.01)

(52) U.S. Cl.
CPC ............ *H04L 47/14* (2013.01); *H04L 47/263* (2013.01); *H04L 47/33* (2013.01); *H04W 28/02* (2013.01); *H04W 28/22* (2013.01)

(56) References Cited

U.S. PATENT DOCUMENTS

| | | | |
|---|---|---|---|
| 2006/0176810 A1 | 8/2006 | Kekki | |
| 2008/0279097 A1* | 11/2008 | Campion et al. | 370/229 |
| 2010/0034090 A1* | 2/2010 | Bader et al. | 370/236 |
| 2010/0220592 A1* | 9/2010 | Pan et al. | 370/232 |
| 2014/0254357 A1* | 9/2014 | Agarwal et al. | 370/229 |

FOREIGN PATENT DOCUMENTS

| | | |
|---|---|---|
| CN | 101346971 A | 1/2009 |
| CN | 101543112 A | 9/2009 |
| CN | 101582852 A | 11/2009 |

OTHER PUBLICATIONS

3GPP TS 26.114 V9.0.0; 3rd Generation Partnership Project; Technical Specification Group Services and System Aspects; IP Multimedia Subsystem (IMS); Multimedia Telephony; Media Handling and Interaction; Release 9; Sep. 9, 2009; 155 pages.
Office Action dated Jul. 2, 2012; U.S. Appl. No. 12/685,636, filed Jan. 11, 2010; 19 pages.
Final Office Action dated Nov. 7, 2012; U.S. Appl. No. 12/685,636, filed Jan. 11, 2010; 10 pages.
Office Action dated Aug. 8, 2013; U.S. Appl. No. 12/685,636, filed Jan. 11, 2010; 9 pages.
Notice of Allowance dated Nov. 15, 2013; U.S. Appl. No. 12/685,636, filed Jan. 11, 2010; 8 pages.
Office Action dated Mar. 2, 2012; U.S. Appl. No. 12/685,630, filed Jan. 11, 2010; 22 pages.
Final Office Action dated Aug. 28, 2012; U.S. Appl. No. 12/685,630, filed Jan. 11, 2010; 8 pages.
Advisory Action dated Nov. 8, 2012; U.S. Appl. No. 12/685,630, filed Jan. 11, 2010; 2 pages.
Notice of Allowance dated Jan. 14, 2013; U.S. Appl. No. 12/685,630 filed Jan. 11, 2010; 8 pages.
PCT Written Opinion of the International Searching Authority; Application No. PCT/US2011/020755; Apr. 1, 2011; 7 pages.
Chinese Office Action; Application No. 201180013493.7; Feb. 28, 2015; 14 pages.
European Examination Report; Application No. 11701420.9; Jul. 25, 2014; 7 pages.
European Examination Report; Application No. 11701420.9; Feb. 17, 2015; 8 pages.
Canadian Office Action; Application No. 2,786,807; Mar. 19, 2015; 4 pages.
Chinese Office Action as Received in Co-pending Application No. 201180013419.5 on May 30, 2014; 10 pages. (No English translation available).
Chinese Office Action as Received in Co-pending Application No. 201180013419.5 on Dec. 8, 2014; 10 pages. (No English translation available).
Chinese Office Action; Application No. 201180013419.5; May 11, 2015; 7 pages.
European Examination Report; Application No. 11701900.0; Jul. 24, 2015; 8 pages.
Chinese Office Action as Received in Co-pending Application No. 201180013493.7 on Sep. 14, 2015; 8 pages. (No English translation available).
European Examination Report; Application No. 11701900.0; Jan. 27, 2016; 8 pages.

* cited by examiner

| PROPORTION OF PACKETS MARKED "CONGESTION EXPERIENCED" | DEGREE OF CONGESTION EXPERIENCED | BEHAVIOR |
|---|---|---|
| 0 - 0.33 | NONE | NO CHANGE |
| 0.34 - 0.66 | MEDIUM | REDUCE 1 CODEC RATE WITHIN SET |
| 0.67 - 1.00 | HIGH | REDUCE 2 CODEC RATES WITHIN SET |

*FIG. 7*

| PROPORTION OF PACKETS MARKED "CONGESTION EXPERIENCED" | DEGREE OF CONGESTION EXPERIENCED | BEHAVIOR |
|---|---|---|
| 0 - 0.33 | NONE (AND SOME SPARE CAPACITY | INCREASE 1 CODEC RATE WITHIN SET |
| 0.34 - 0.66 | NONE | NO CHANGE |
| 0.67 - 1.00 | YES | REDUCE 1 CODEC RATES WITHIN SET |

*FIG. 8*

| PERCENTAGE PACKETS MARKED | BITRATE LIMIT (kbps) |
|---|---|
| 0-14 | 12.2 |
| 15-28 | 10.2 |
| 29-42 | 7.95 |
| 43-56 | 7.4 |
| 57-70 | 5.9 |
| 71-84 | 5.15 |
| >84 | 4.75 |

*FIG. 9*

| FIRST ORDER DIFFERENCE | SECOND ORDER DIFFERENCE | CONGESTION CHANGE SPEED | RECOMMENDED USER EQUIPMENT CODEC RATE CHANGE |
|---|---|---|---|
| INCREASE | INCREASE | FASTER | REDUCE MORE |
| | DECREASE | SLOWER | UNCHANGED OR REDUCE |
| DECREASE | INCREASE | SLOWER | UNCHANGED OR INCREASE |
| | DECREASE | FASTER | INCREASE MORE |
*FIG. 10*
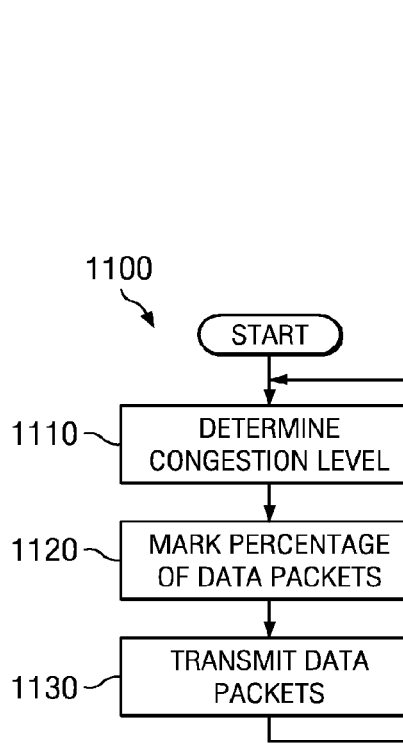
*FIG. 11*
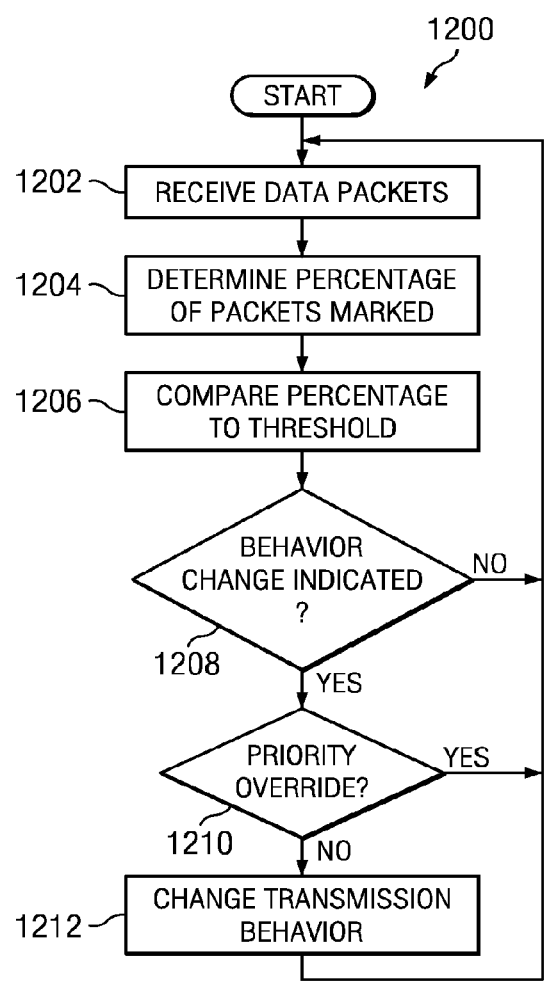
*FIG. 12*

CONGESTION LEVEL INDICATION WITH EXPLICIT CONGESTION NOTIFICATION IN COMMUNICATION SYSTEMS

PRIORITY CLAIM

This application is a continuation of prior U.S. patent application Ser. No. 12/685,636, filed Jan. 11, 2010, which is incorporated herein by reference.

TECHNICAL FIELD

The present disclosure relates generally to a communication system and, in particular, to a method and apparatus for indicating and responding to congestion in a communication system.

BACKGROUND

A mobile or cellular telephone system is an example of a communication system that is capable of transmitting and receiving data between end user equipment or applications and network equipment. Transmitted and received data may be in the form of data packets. Transmitted data packets may be in a variety of formats and include a variety of different types of data, including voice data, binary data, video data, and the like.

In a communication system, such as a mobile or cellular telephone communication system, various methods are used to establish the rate of communication or bitrate at which data packets are transferred between a user's mobile device, such as a mobile telephone, and the rest of the system. For example, if Adaptive MultiRate (AMR) or Adaptive MultiRate-Wideband (AMR-WB) transmission is used, at call set-up a mode set is negotiated through a Session Description Protocol (SDP). The Session Description Protocol parameter "mode-set" takes a value that represents a subset of bitrates that can be used during a call. The value is selected from the set $\{0, \ldots, 7\}$ for Adaptive MultiRate transmissions and from the set $\{0, \ldots, 8\}$ for Adaptive MultiRate-Wideband transmissions. The value to be used may be selected, for example, based on detected signal strength between the mobile device and the rest of the network at the time of call set-up. The mode-set value represents a subset of bitrates that can be used during the call. When a sender encodes speech it must use one of the bitrates in the mode set. The mode used to encode is then indicated to the receiver in a Codec Mode Indication (CMI) field of the Real-time Transport Protocol payload.

For Long Term Evolution (LTE), the relevant specification in terms of codec rate adaptation is 3GPP TS 26.114, which specifies the Multimedia Telephony Services over IP Multimedia Subsystem (MTSI). Included in this specification are several means of adaptation. For example, bit rate, number of frames per packet, and amount of redundant frames per packet, may all be adapted according to requests from the receiver of the encoded media. These requests are generally included in the RTP Control Protocol Application Defined (RTCP APP) packets.

Problems arise in a communication system when the demands on the network system to timely process data packets for transmission through the system exceeds network capacity. In such situations, the network is said to be experiencing congestion. A typical response to such congestion is for the network simply to drop packets received from or to be transmitted to a user application and that cannot be processed by the network in a timely manner.

Explicit Congestion Notification (ECN) is a method for the network to indicate to user applications that the network is experiencing congestion. In response to receiving such a notification, a user application can reduce its sending rate in order to avoid packets being dropped. For example, Explicit Congestion Notification may be implemented by marking two bits in the Internet Protocol (IP) header of a packet as '11', indicating that congestion is being experienced by a network element processing the packet. Via a feedback mechanism, the sender of the packet is notified of the congestion and can then reduce its sending rate.

Until recently, it has not been specified how to apply Explicit Congestion Notification to User Datagram Protocol (UDP) traffic. The User Datagram Protocol itself does not contain a feedback mechanism. However, most real-time applications, such as voice, video, real-time text, and the like, use Real-time Transport Protocol (RTP) over User Datagram Protocol, which does have a feedback mechanism, namely RTP Control Protocol (RTCP). It has been proposed to use explicit congestion notification with Real-time Transport Protocol. In this proposal, the receiver of Internet Protocol packets that are marked "congestion experienced" communicates this information to the sender through the RTP Control Protocol feedback packets. The sender can then reduce its bitrate in order to reduce congestion. For Adaptive MultiRate (AMR) or Adaptive MultiRate-Wideband (AMR-WB) transmissions, the sender can change its transmission mode to reduce congestion.

As an alternative, the receiver of packets marked for congestion experienced may use the Codec Mode Request (CMR) field in the Real-time Transport Protocol payload to request that the sender reduce its bitrate. This has the advantage that additional RTP Control Protocol traffic is not created, when the network is already congested, in order to communicate which packets were marked for congestion experienced to the sender. It has the disadvantage that it cannot be used to control the bitrates when data packet flow is unidirectional. For codecs that do not have a Codec Mode Request field in the Real-time Transport Protocol payload and for other media types, it is possible that a Temporary Maximum Media Stream Bit Rate Request (TMMBR) may be used to request the sender to reduce its bitrate.

Therefore, it would be advantageous to have a method and apparatus that takes into account at least some of the issues discussed above, as well as possibly other issues.

BRIEF DESCRIPTION OF THE DRAWINGS

For a better understanding of the various embodiments described herein, and to show more clearly how they may be carried into effect, reference will now be made, by way of example only, to the accompanying drawings, which show at least one illustrative embodiment and in which:

FIG. 7 is a table indicating example congestion level thresholds and user equipment behaviors in accordance with an illustrative embodiment;

FIG. 8 is a table indicating other example congestion level thresholds and user equipment behaviors in accordance with an illustrative embodiment;

FIG. 9 is a table indicating further example congestion level thresholds and user equipment behaviors in accordance with an illustrative embodiment;

FIG. 10 is a table indicating user equipment behaviors in response to a rate of change of congestion in accordance with an illustrative embodiment;

FIG. 11 is a flowchart of a method for marking a percentage of data packets to indicate a level of congestion in accordance with an illustrative embodiment;

FIG. 12 is a flowchart of a method for changing user equipment behavior in response to an indicated level of congestion in accordance with an illustrative embodiment;

DETAILED DESCRIPTION

Figure 1:
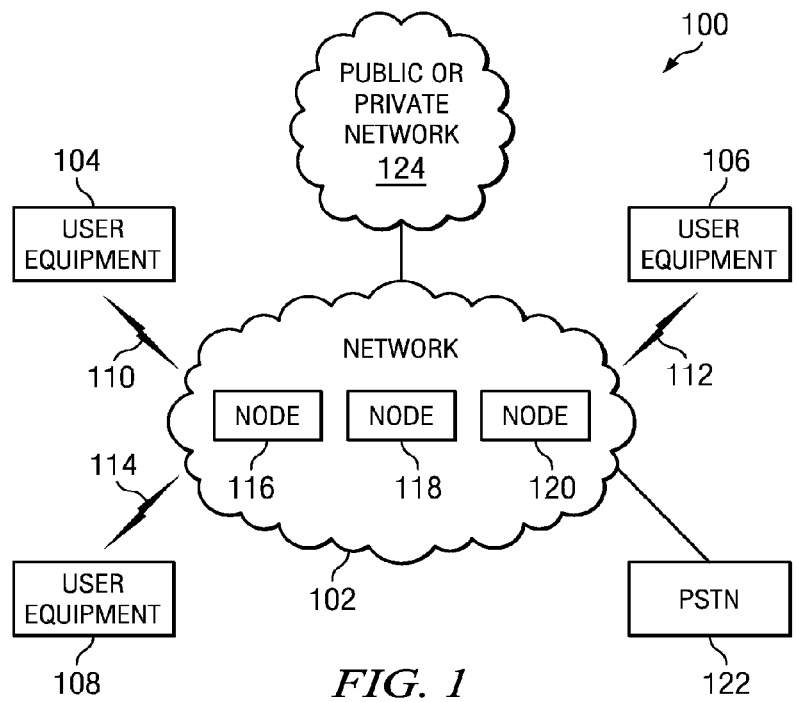
FIG. 1 is a block diagram of an embodiment of a wireless communication system including a wireless network and user equipment in accordance with an illustrative embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The different embodiments disclosed herein recognize and take into account a number of different considerations. For example, the disclosed embodiments recognize and take into account that current communication system specifications do not describe how a sender's bitrate is to be reduced when packets marked to indicate that congestion is experienced are observed. Consider, for example, the scenario where an Adaptive MultiRate speech codec and the default Adaptive MultiRate mode set for a Multimedia Telephony Service for IP Multimedia Subsystem corresponding to bitrates of 12.2 kbps, 7.4 kbps, 5.9 kbps, and 4.75 kbps is used. If the sender is currently using the 12.2 kbps bitrate, and packets marked to indicate congestion experienced are observed, current specifications do not specify how the sender is to respond. In this case, response options include jumping immediately all the way down to 4.75 kbps or stepping down to the next lowest rate in the mode set and then stepping down again if packets marked to indicate congestion experienced continue to be observed. The disclosed embodiments recognize and take into account that current specifications do not specify how the bitrate should be adapted back up if congestion eases. Furthermore, the disclosed embodiments recognize and take into account that current specifications do not specify how user priority and emergency calls should be handled in the context of a system or method for adapting the bitrate in response to an explicit congestion notification.

The disclosed embodiments recognize and take into account that currently solutions for explicit congestion notification and responding thereto employ only an on/off indication of congestion. Either data packets are marked to indicate that congestion is experienced or they are not. Thus, the indication that congestion is being experienced is only binary. There is no indication of the degree of congestion. The disclosed embodiments recognize and take into account that the degree of congestion would be very useful information in terms of adapting a sender's bitrate in response to congestion being experienced. The disclosed embodiments also recognize and take into account that knowing the degree of congestion would also allow differentiation in user device application behavior, for example, according to priority or emergency calls.

The disclosed embodiments recognize and take into account that, for codecs that do not necessarily have a discrete set of rates, having an indication of the level of congestion would be especially valuable. For example, video codecs can use a very large range of bitrates according to frame rate, resolution, etc. If there is only a binary indication of network congestion, it is impossible to determine how much bitrate reduction is really needed. A drastic reduction in bitrate would significantly degrade user experience, but may not be needed, depending upon the level of network congestion.

The embodiments disclosed herein provide a system and method for a communication network in which a network experiencing congestion indicates to a user application the degree of network congestion. In response to receiving such an indication, a user application may respond more intelligently and more appropriately than would be possible if only a binary indication of congestion or no congestion were provided by the network. In accordance with disclosed embodiments, data packets are marked to indicate that congestion is being experienced, with the percentage of marked packets, or the percentage of a subset of packets so marked, providing an indication of the degree of congestion on the network. The behavior of a sender, such as user equipment or another network endpoint serving the user, may be adapted according to the marked packet percentages indicating the degree of congestion. For example, the response of the mobile device or other sender to the indicated degree of congestion may include codec selection, mode set selection in the case of speech codecs, selection of profiles or levels in the case of video codecs, rate adaptation, or any other type of adaptation that can reduce or otherwise adjust the amount of traffic on the network in response to the indicated degree of congestion, such as adjusting the number of frames per packet or frame aggregation, adjusting the number or frequency of redundant packets sent, and the use of header compression. Having some indication of the level of congestion, rather than simply a binary indication, allows for more finely tuned behavior in terms of network performance and also for perceived user quality.

Turning first to FIG. 1, a wireless communication system is depicted in accordance with an illustrative embodiment. Wireless communication system 100 includes wireless network 102. Wireless network 102 may comprise a single network or multiple networks forming a network of networks. Wireless network 102 provides for wireless communication by user equipment 104, 106, and 108 via wireless communication channels 110, 112, and 114 established between user equipment 104, 106, and 108 and wireless network 102. As will be discussed in more detail below, examples of user equipment 104, 106, and 108 may include mobile wireless communication devices including pagers, cellular phones, cellular smart-phones, wireless organizers, personal digital assistants, computers, laptops, handheld wireless communication devices, wirelessly enabled notebook computers and the like. Although only three user equipments 104, 106, and 108 are shown by example in FIG. 1, wireless network 102 may support use of much larger numbers of user equipment of various different types.

Wireless communication channels 110, 112, and 114 are established dynamically between user equipment 104, 106, and 108 and individual nodes 116, 118, and 120 of wireless network 102. Channels 110, 112, and 114 may be established, for example, at the time that a call to or from one of user equipment 104, 106, and 108 is initiated. Certain characteristics of communication channels 110, 112, and 114 are established at call set-up. For example, such characteristics may include the codec that is to be employed by the communication channel 110, 112, or 114 during the call. For example, the codec to be used may be selected based on factors such as the signal strength or signal quality between user equipment 104, 106, and 108 and a corresponding one of nodes 116, 118, or 120 of the network 102 at the time of call set-up. Although only three nodes 116, 118, and 120 are shown by example in FIG. 1, wireless network 102 may include many more such nodes.

Network 102 operates to transfer data packets between user equipment 104, 106, and 108 using network nodes 116, 118, and 120. Network 102 also may operate to transfer data packets between user equipment 104, 106, and 108 and other networks, such as a conventional public switch telephone network (PSTN) 122, or other public or private networks 124, such as the Internet. This transfer of data packets to and from other networks 122 and 124 also occurs using network nodes 116, 118, and 120. As packet traffic through one or more of nodes 116, 118, and 120 increases, the capacity of network 102 to process and transfer such data packets in a timely manner to and from one or more user equipment 104, 106, and 108 may be exceeded. In this case, network 102 or one or more network nodes 116, 118, or 120 is said to be congested. Explicit Congestion Notification in accordance with the embodiments disclosed herein provides an improved system and method for responding intelligently and more effectively when such network congestion occurs.

Figure 2:
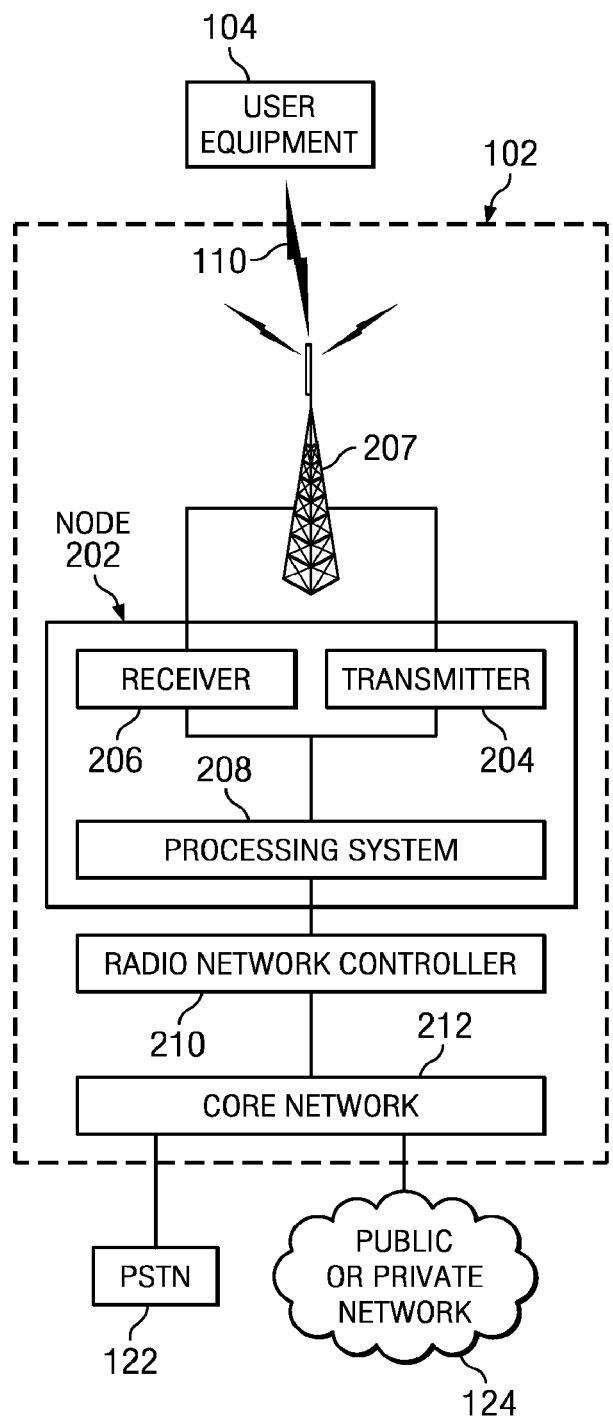
FIG. 2 is a block diagram of a wireless network in accordance with an illustrative embodiment.

Referring now to FIG. 2, a block diagram of an example implementation of wireless network 102 in which illustrative embodiments may be implemented is presented. Wireless network 102 may be, for example, a Universal Mobile Telecommunications System (UMTS) Terrestrial Radio Access Network (UTRAN). However, illustrative embodiments may be implemented in other similar or different communication networks, such as wireless networks using Long Term Evolution (LTE) technology. Illustrative embodiments also may be implemented in wireless networks configured in accordance with General Packet Radio Service (GPRS) and Global Systems for Mobile (GSM) technologies.

Wireless network 102 includes node 202. In this example, node 202 is an example of one of nodes 116, 118, or 120 of FIG. 1. As discussed above, in practice, wireless network 102 comprises one or more of nodes 202. For example, node 202 may be configured as a Node B in a UMTS Terrestrial Radio Access Network or as the evolved Node B (eNodeB) in a Long Term Evolution network.

Node 202 may be referred to as a base transceiver station. Node 202 includes one or more radio frequency transmitters 204 and receivers 206 coupled to one or more antennas 207. Transmitters 204 and receivers 206 are used by node 202 to communicate directly with mobile devices, such as user equipment 104, via wireless communication channel 110. Node 202 provides wireless network coverage for a particular coverage area, commonly referred to as a "cell". Node 202 also includes one or more processing systems 208, such as computer processing systems, for implementing the functionality provided by node 202.

Node 202 is coupled to, and controlled by, radio network controller 210. Multiple nodes 202 may be coupled to radio network controller 210 in network 102 in accordance with an illustrative embodiment. Radio network controller 210 is responsible for controlling all nodes 202 that are connected to it. Radio network controller 210 carries out radio resource management, such as the management of radio channels and some mobility management functions. Radio network controller 210 may be the point where encryption is done before user data is sent to and from user equipment 104.

Radio network controller 210 connects to core network 212. Multiple radio network controllers 210 may be coupled to core network 212. A main function of core network 212 is to provide for the routing of data packets between user equipment on network 102 and between user equipment on network 102 and users on other networks, such as Public Switched Telephone Network 122 and other public or private networks 124, such as the Internet. Functions provided by core network 212 in a UMTS network may be implemented, for example, by a media gateway and a Serving General Packet Radio Service (GPRS) Support Node (SGSN). A media gateway is a translation device or service that converts digital media streams between disparate telecommunications networks. Media gateways enable multimedia communications across networks over multiple transport protocols, such as Asynchronous Transfer Mode (ATM) and Internet Protocol (IP). An SGSN is responsible for the delivery of data packets from and to the mobile stations within its geographical service area. Its tasks may include packet routing and transfer, mobility management, logical link management, and authentication and charging functions. In a Long Term Evolution (LTE) network, similar functions may be provided in core network 212 by, for example, a mobility management entity (MME), a serving gateway (SGW) and a packet data network (PDN) gateway (PGW).

This list of components presented with respect to FIG. 2 is not meant to be an exhaustive list of the components of a wireless network, but rather a list of components that are commonly used in communications through wireless network 102.

User equipment 104 is a two-way communication device with advanced data communication capabilities including the capability to communicate with other user equipment or computer systems through a network of transceiver stations or nodes described previously. The user equipment may also have the capability to allow voice communication. Depending on the functionality provided by the user equipment, it may be referred to as a data messaging device, a two-way pager, a cellular telephone with data messaging capabilities, a wireless Internet appliance, or a data communication device, with or without telephony capabilities.

Figure 3:
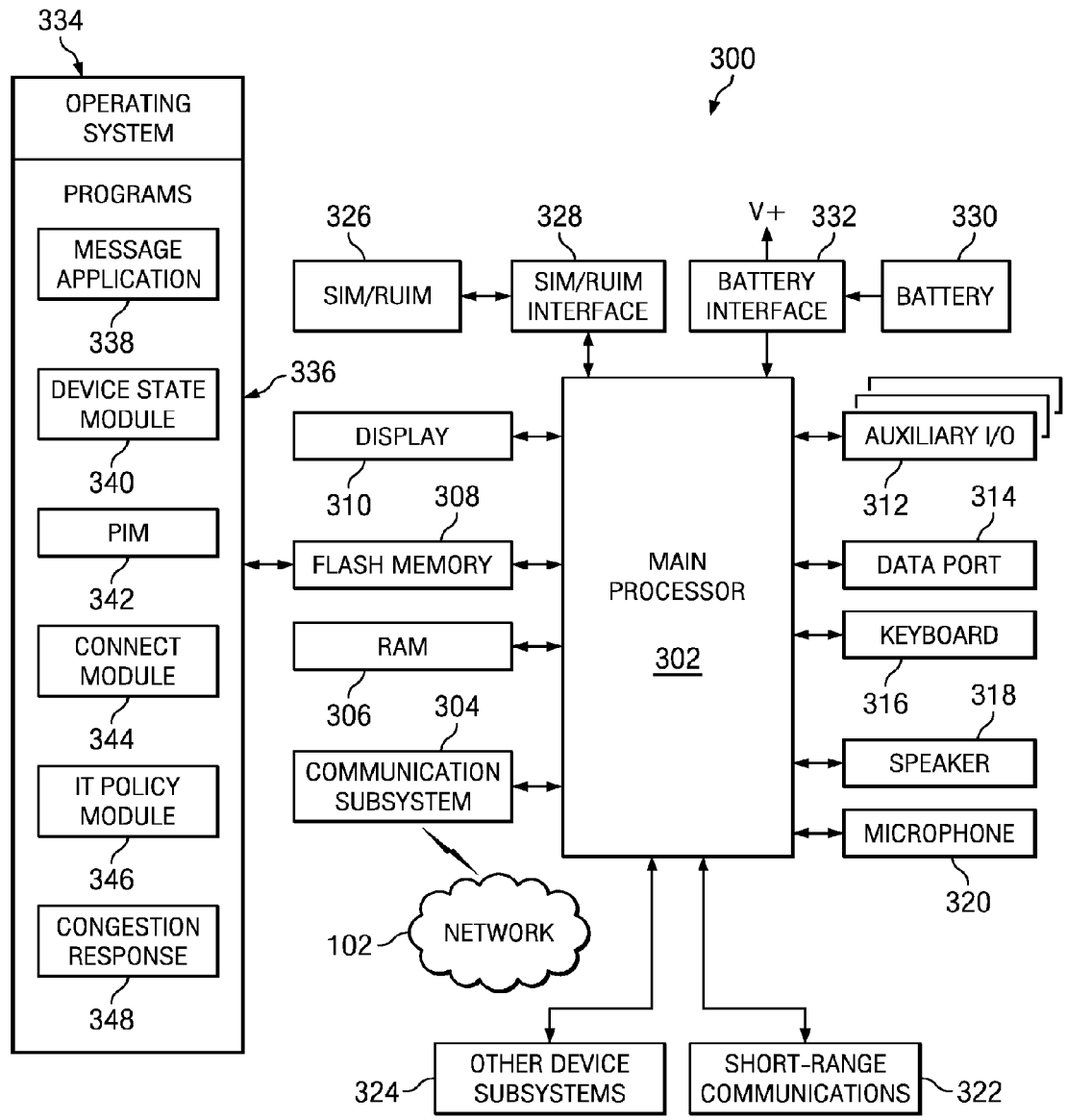
FIG. 3 is a block diagram of an embodiment of user equipment in accordance with an illustrative embodiment.

Shown in FIG. 3 is a block diagram of an illustrative embodiment of user equipment 300. In this example, user equipment 300 is an example of user equipment 104 in FIG. 1 and FIG. 2. User equipment 300 includes a number of components such as a main processor 302 that controls the overall operation of user equipment 300. Communication functions, including data and voice communications, are performed through a communication subsystem 304. The communication subsystem 304 receives messages from and sends messages to wireless network 102, described above. In this illustrative embodiment of user equipment 300, communication subsystem 304 may be configured in accordance with Universal Mobile Telecommunications System (UMTS) technology using the UMTS Terrestrial Radio Access Network (UTRAN) or Long Term Evolution (LTE) technology using Evolved UTRAN (E-UTRAN). Alternatively, communication subsystem 304 may be configured in accordance with the Global System for Mobile Communication (GSM) and General Packet Radio Services (GPRS) standards. New standards are still being defined, but it is believed that they will have similarities to the network behavior described herein, and it will also be understood by persons skilled in the art that the embodiments described herein are intended to use any other suitable standards that are developed in the future. The wireless link connecting communication subsystem 304 with wireless network 102 represents one or more different radio frequency (RF) channels, operating according to defined protocols specified for the particular communication technologies being employed. With newer network protocols, these channels are capable of supporting both circuit switched voice communications and packet switched data communications.

Other wireless networks also may be associated with user equipment 300 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, as mentioned above, third-generation (3G) networks like EDGE and UMTS, and Long Term Evolution (LTE) networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

Main processor 302 interacts with additional subsystems such as random access memory (RAM) 306, flash memory 308, display 310, auxiliary input/output (I/O) subsystem 312, data port 314, keyboard 316, speaker 318, microphone 320, short-range communications 322, and other device subsystems 324.

Some of the subsystems of user equipment 300 perform communication-related functions, whereas other subsystems may provide "resident" or on-device functions. By way of example, display 310 and keyboard 316 may be used for both communication-related functions, such as entering a text message for transmission over network 102, and device-resident functions such as a calculator or task list.

User equipment 300 can send and receive communication signals over wireless network 102 after required network registration or activation procedures have been completed. Network access is associated with a subscriber or user of user equipment 300. To identify a subscriber, user equipment 300 requires SIM card/RUIM 326 (i.e. Subscriber Identity Module or a Removable User Identity Module) to be inserted into a SIM/RUIM interface 328 in order to communicate with a network. SIM card or RUIM 326 is one type of a conventional "smart card" that can be used to identify a subscriber of user equipment 300 and to personalize user equipment 300, among other things. SIM card/RUIM 326 includes a processor and memory for storing information.

Without SIM card 326, user equipment 300 is not fully operational for communication with wireless network 102. By inserting SIM card/RUIM 326 into SIM/RUIM interface 328, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. Once SIM card/RUIM 326 is inserted into SIM/RUIM interface 328, it is coupled to main processor 302. In order to identify the subscriber, SIM card/RUIM 326 can include some user parameters such as an International Mobile Subscriber Identity (IMSI). An advantage of using SIM card/RUIM 326 is that a subscriber is not necessarily bound by any single physical user equipment. SIM card/RUIM 326 may store additional subscriber information for user equipment as well, including datebook (or calendar) information and recent call information. Alternatively, user identification information can also be programmed into flash memory 308.

User equipment 300 is a battery-powered device and includes battery interface 332 for receiving one or more rechargeable batteries 330. In at least some embodiments, battery 330 may be a smart battery with an embedded microprocessor. Battery interface 332 is coupled to a regulator (not shown), which assists battery 330 in providing power V+ to user equipment 300. Although current technology makes use of a battery, future technologies, such as micro fuel cells, may provide the power to user equipment 300.

User equipment 300 also includes operating system 334 and other programs 336. Programs 336 are described in more detail below. Operating system 334 and programs 336 may be implemented as software components that are run by main processor 302. Operating system 334 and programs 336 typically are stored as program code on a media readable by a processor, such as main processor 302. Such readable storage media may include a persistent storage device, such as flash memory 308, which may alternatively be a read-only memory (ROM) or similar storage element. Those skilled in the art will appreciate that portions of operating system 334 and programs 336, such as specific device applications, or parts thereof, may be temporarily loaded into a volatile storage device, such as RAM 306. Other software components also may be included, as is well known to those skilled in the art.

Programs 336 that control basic device operations, including data and voice communication applications, will normally be installed on user equipment 300 during its manufacture. Other programs 336 include message application 338. Message application 338 can be any suitable software program that allows a user of user equipment 300 to send and receive electronic messages. Various alternatives exist for message application 338, as is well known to those skilled in the art. Messages that have been sent or received by the user are typically stored in flash memory 308 of user equipment 300, or some other suitable storage element in user equipment 300. In at least some embodiments, some of the sent and received messages may be stored remotely from user equipment 300 such as in a data store of an associated host system that user equipment 300 communicates with.

Programs 336 may further include device state module 340, Personal Information Manager (PIM) 342, and other suitable modules (not shown). Device state module 340 provides persistence, i.e., device state module 340 ensures that important device data is stored in persistent memory, such as flash memory 308, so that the data is not lost when user equipment 300 is turned off or loses power.

PIM 342 includes functionality for organizing and managing data items of interest to the user, such as, but not limited to, e-mail, contacts, calendar events, voice mails, appointments, and task items. A PIM application has the ability to send and receive data items via wireless network 102. PIM data items may be seamlessly integrated, synchronized, and updated via wireless network 102 with the user equipment subscriber's corresponding data items stored or associated with a host computer system. This functionality creates a mirrored host computer on user equipment 300 with respect to such items. This can be particularly advantageous when the host computer system is the user equipment subscriber's office computer system.

User equipment 300 also includes connect module 344, and IT policy module 346. Connect module 344 implements the communication protocols that are required for user equipment 300 to communicate with the wireless infrastructure and any host system, such as an enterprise system, that user equipment 300 is authorized to interface with.

Connect module 344 includes a set of APIs that can be integrated with user equipment 300 to allow user equipment 300 to use any number of services associated with an enterprise system. Connect module 344 allows user equipment 100 to establish an end-to-end secure, authenticated communication pipe with the host system. A subset of applications for which access is provided by connect module 344 can be used to pass IT policy commands from the host system to user equipment 300. This can be done in a wireless or wired manner. These instructions can then be passed to IT policy module 346 to modify the configuration of user equipment 300. Alternatively, in some cases, the IT policy update can also be done over a wired connection.

IT policy module 346 receives IT policy data that encodes the IT policy. IT policy module 346 then ensures that the IT policy data is authenticated by user equipment 300. The IT policy data can then be stored in flash memory 306 in its native form. After IT policy data is stored, a global notification can be sent by IT policy module 346 to all of the applications residing on user equipment 300. Applications for which the IT policy may be applicable then respond by reading the IT policy data to look for IT policy rules that are applicable. After the IT policy rules have been applied to the applicable applications or configuration files, IT policy module 346 sends an acknowledgement back to the host system to indicate that the IT policy data was received and successfully applied.

In accordance with a disclosed embodiment, congestion response module 348 may be provided to alter the behavior of user equipment 300 in response to a congestion level indication. As will be discussed in more detail below, congestion response module 348 may include procedures for determining a congestion level from a percentage of received data packets that are marked to indicate that network congestion is being experienced. Congestion response module 348 may also include procedures for altering the behavior of user equipment 300 in response to a determined congestion level, such as by reducing the transmission rate of user equipment 300. Congestion response module 348 may include one or more stand alone modules, or may be implemented, in whole or in part, as part of another module, such as connect module 344.

Other types of programs or software applications also may be installed on user equipment 300. These software applications may be third party applications, which are added after the manufacture of user equipment 300. Examples of third party applications include games, calculators, utilities, etc.

Additional applications can be loaded onto user equipment 300 through at least one of wireless network 102, auxiliary I/O subsystem 312, data port 314, short-range communications subsystem 322, or any other suitable device subsystem 324. This flexibility in application installation increases the functionality of user equipment 300 and may provide enhanced on-device functions, communication-related functions, or both. For example, secure communication applications may enable electronic commerce functions and other such financial transactions to be performed using user equipment 300.

Data port 314 enables a subscriber to set preferences through an external device or software application and extends the capabilities of user equipment 300 by providing for information or software downloads to user equipment 300 other than through a wireless communication network. The alternate download path may, for example, be used to load an encryption key onto user equipment 300 through a direct and thus reliable and trusted connection to provide secure device communication.

Data port 314 can be any suitable port that enables data communication between user equipment 300 and another computing device. Data port 314 can be a serial or a parallel port. In some instances, data port 314 can be a USB port that includes data lines for data transfer and a supply line that can provide a charging current to charge battery 330 of user equipment 300.

Short-range communications subsystem 322 provides for communication between user equipment 300 and different systems or devices, without the use of wireless network 102. For example, subsystem 322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by communication subsystem 304 and input to main processor 302. Main processor 302 will then process the received signal for output to display 310 or alternatively to auxiliary I/O subsystem 312. A subscriber may also compose data items, such as e-mail messages, for example, using keyboard 316 in conjunction with display 310 and possibly auxiliary I/O subsystem 312. Auxiliary subsystem 312 may include devices such as: a touch screen, mouse, track ball, infrared fingerprint detector, or a roller wheel with dynamic button pressing capability. Keyboard 316 is preferably an alphanumeric keyboard or telephone-type keypad. However, other types of keyboards may also be used. A composed item may be transmitted over wireless network 102 through communication subsystem 304.

For voice communications, the overall operation of user equipment 300 is substantially similar, except that the received signals are output to speaker 318, and signals for transmission are generated by microphone 320. Alternative voice or audio I/O subsystems, such as a voice message recording subsystem, can also be implemented on user equipment 300. Although voice or audio signal output is accomplished primarily through speaker 318, display 110 can also be used to provide additional information, such as the identity of a calling party, duration of a voice call, or other voice call related information.

Figure 4:
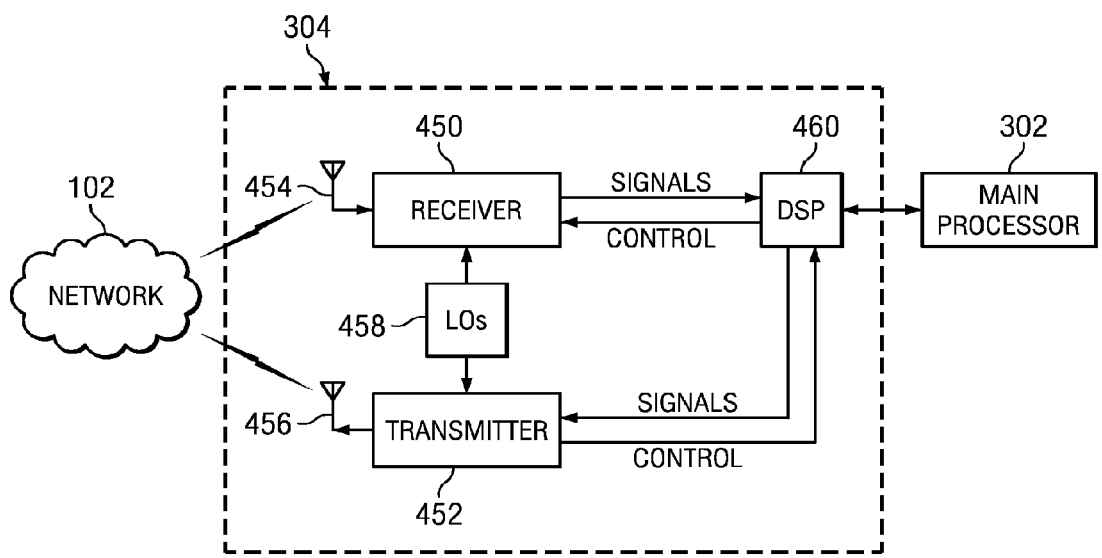
FIG. 4 is a block diagram of an embodiment of a communication subsystem component of the user equipment in FIG. 3.

Referring now to FIG. 4, a block diagram of communication subsystem component 304 of user equipment 300 of FIG. 3 is shown. Communication subsystem 304 includes receiver 450 and transmitter 452, as well as associated components, such as one or more embedded or internal antenna elements 454 and 456, local oscillators (LOs) 458, and a processing module, such as a digital signal processor (DSP) 460. The particular design of communication subsystem 304 is dependent upon the communication network 102 with which user equipment 300 is intended to operate. Thus, it should be understood that the design illustrated in FIG. 4 serves only as one example.

Signals received by antenna 454 through wireless network 102 are input to receiver 450, which may perform such common receiver functions as signal amplification, frequency down conversion, filtering, channel selection, and analog-to-digital (A/D) conversion. A/D conversion of a received signal allows more complex communication functions, such as demodulation and decoding, to be performed in DSP 460. In a similar manner, signals to be transmitted are processed, including modulation and encoding, by DSP 460. These DSP-processed signals are input to transmitter 452 for digital-to-analog (D/A) conversion, frequency up conversion, filtering, amplification and transmission over wireless network 102 via antenna 456. DSP 460 not only processes communication signals, but also provides for receiver and transmitter control. For example, gains applied to communication signals in receiver 450 and transmitter 452 may be adaptively controlled through automatic gain control algorithms implemented in DSP 460.

The wireless link between user equipment 300 and wireless network 102 can contain one or more different channels, typically different RF channels, and associated protocols used between user equipment 300 and wireless network 102. An RF channel is a limited resource that must be conserved, typically due to limits in overall bandwidth and limited battery power of user equipment 300.

When user equipment 300 is fully operational, transmitter 452 typically is keyed or turned on only when it is transmitting to wireless network 102 and is otherwise turned off to conserve resources. Similarly, receiver 450 is periodically turned off to conserve power until it is needed to receive signals or information (if at all) during designated time periods.

One or more different illustrative embodiments may be applied to types of communications and standards other than those described above with respect to FIGS. 1-4. For example, without limitation, the different illustrative embodiments may be implemented using LTE Advanced. Additionally, the wireless networks illustrated may take the form of or include 4G networks.

Figure 5:
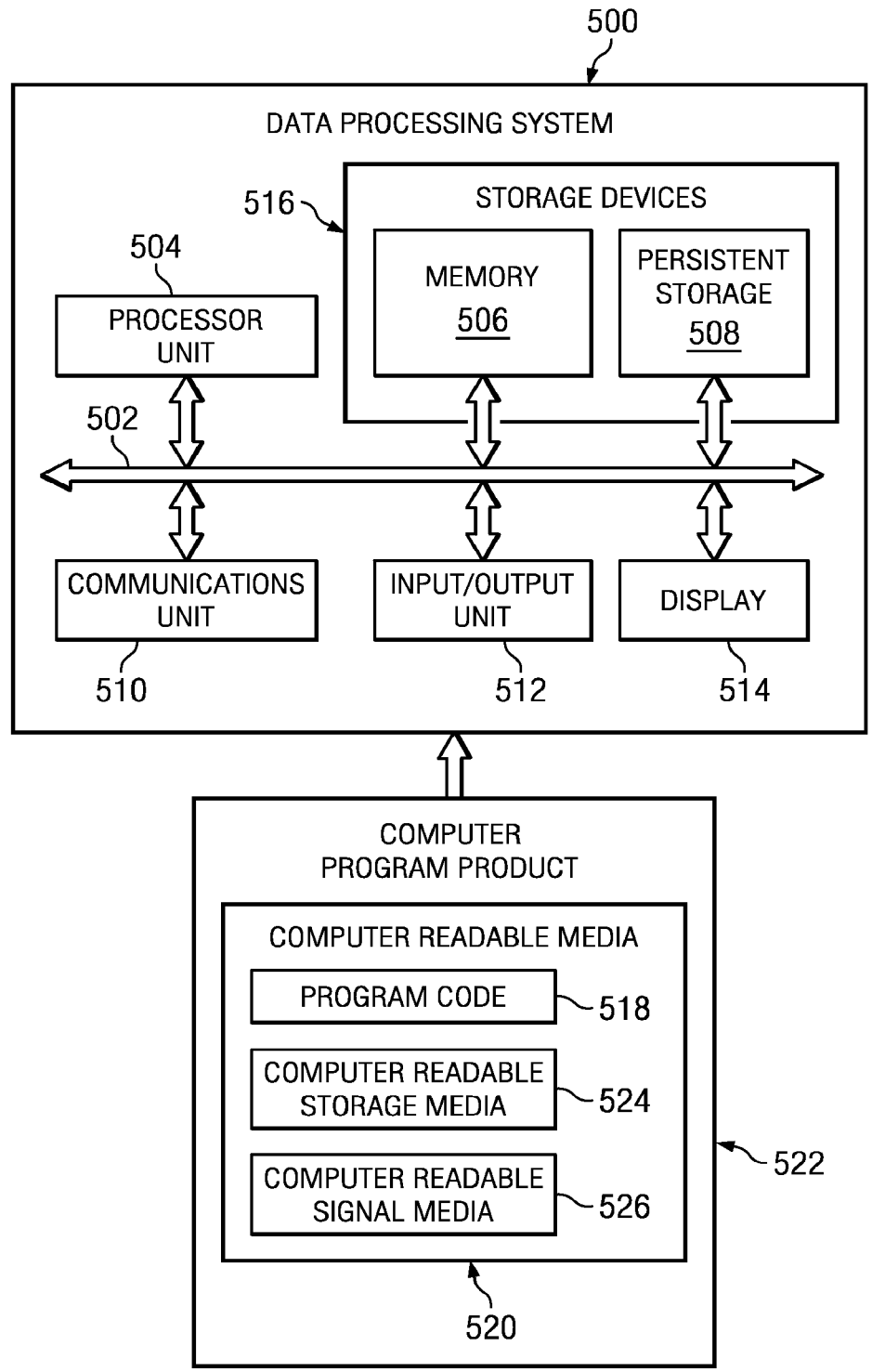
FIG. 5 is a block diagram of a data processing system depicted in accordance with an illustrative embodiment.

Turning now to FIG. 5, a diagram of data processing system 500 is depicted in accordance with an illustrative embodiment. In this example, data processing system 500 is an example of one implementation of processing system 208 in node 202 in FIG. 2. Data processing system 500, or portions thereof, also may be used to implement one or more functions of user equipment 300 as illustrated in FIG. 3. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory, or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 in order to be run by processor unit 504. The processes of the different embodiments may be performed by processor unit 504 using computer implemented instructions, which may be located in a memory, such as memory 506.

These instructions are referred to as program code, computer usable program code, or computer readable program code that may be read and run by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 to be run by processor unit 504. Program code 518 and computer readable media 520 form computer program product 522. In one example, computer readable media 520 may be computer readable storage media 524 or computer readable signal media 526. Computer readable storage media 524 may include, for example, an optical or magnetic disc that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The illustration of hardware components in FIGS. 1-5 are not meant to imply physical or architectural limitations to the manner in which different illustrative embodiments may be implemented. Other components in addition to or in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 6:
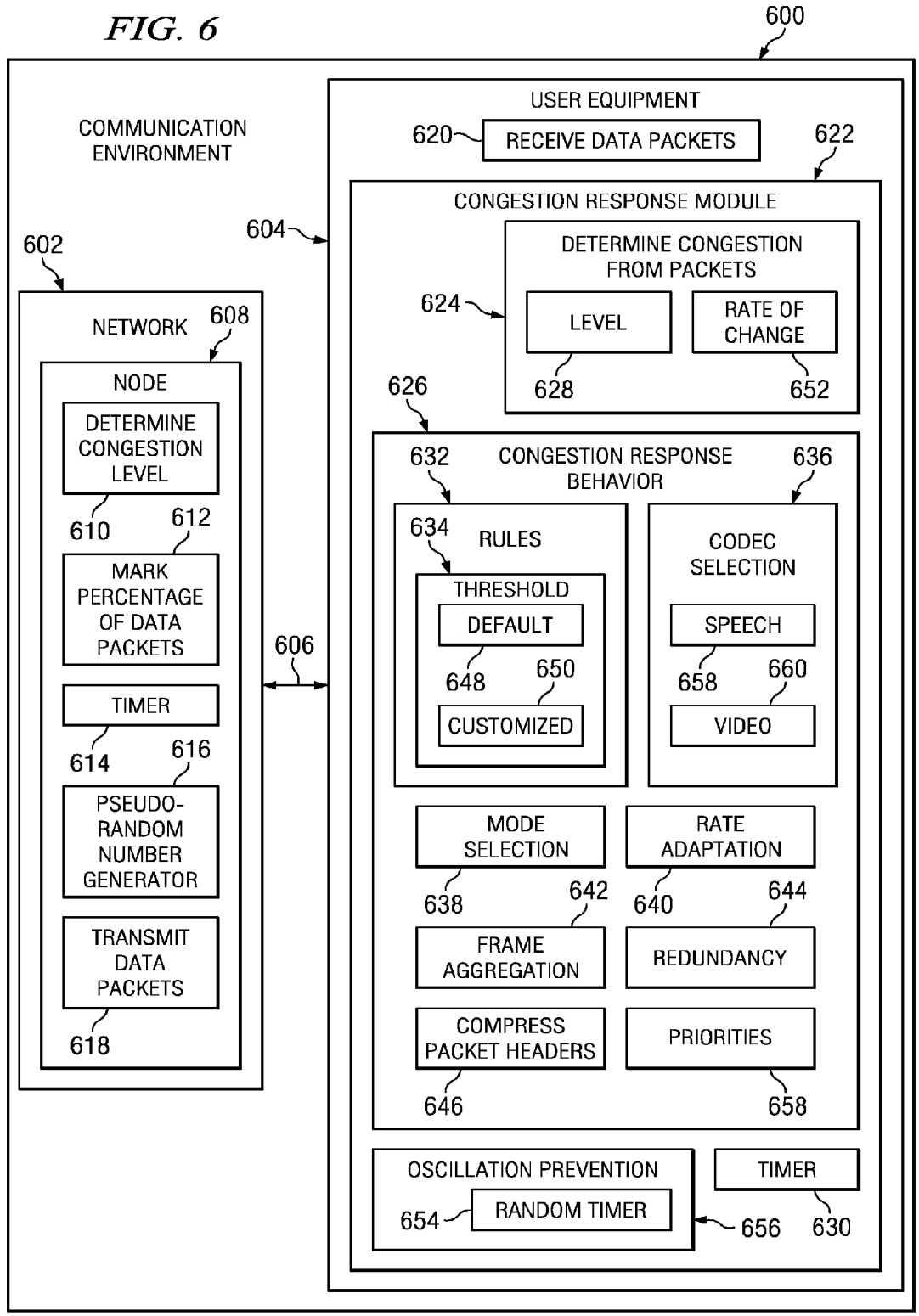
FIG. 6 is a block diagram illustrating a communication environment in accordance with an illustrative embodiment.

Turning now to FIG. 6, a block diagram illustrating communication environment 600 is depicted in accordance with an illustrative embodiment. Communication network 100 of FIG. 1 is an example of one implementation of communication environment 600 of FIG. 6. Communication environment 600 includes one or more networks 602 in association with user equipment 604. Wireless network 102 in FIG. 1 is an example of one implementation of network 602 in FIG. 6. User equipment 104 in FIGS. 1 and 300 in FIG. 3 are examples of user equipment 604 in FIG. 5. As discussed above, user equipment 604 may include a variety of devices, such as mobile wireless communication devices including pagers, cellular phones, cellular smart-phones, wireless organizers, personal digital assistants, computers, laptops, handheld wireless communication devices, wirelessly enabled notebook computers and the like. In operation, user equipment 604 is in communication with network 602 via wireless communication channel 606 in the manner described above. Thus, network 602 and user equipment 604 may exchange data packets across wireless channel 606.

Network 602 includes one or more network nodes 608. Wireless network node 202 of FIG. 2 is one example of node 608 of FIG. 5. Node 608 may include any node on network 602. Network node 608 may itself comprise user equipment, as described above, which is a part of or in communication with network 602.

In accordance with an illustrative embodiment, network node 608 includes a module for performing a function to determine a congestion level 610 on network 602. Any system or method currently known, or which becomes known, for determining a congestion level may be employed to implement this function. In particular, the function of determining a congestion level preferably may determine a congestion level at node 608 or at any other location in network 602 that may affect processing by network 602 of data packets to be delivered to or received from user equipment 604.

In accordance with an illustrative embodiment, network node 608 includes a module for performing a function for marking a percentage of data packets 612 to be transmitted to user equipment 604. Marked packets may be marked with a marker indicating "Congestion Experienced". In accordance with an illustrative embodiment, and as will be described in more detail below, the percentage of packets over a given marking period that are marked is related to, and thus provides an indication of, the determined congestion level for the specified marking period. The marking period may be defined by use of timer 614.

Packet marking indicating "Congestion Experienced" may include marking currently used or proposed for Explicit Congestion Notification, such as marking two bits in the Internet Protocol (IP) header of a packet as '11'. Marking a packet "Congestion Experienced" in accordance with an illustrative embodiment may employ other marking schemes, dependent upon the types of data and packets to be transmitted, and may include marking in the header and/or in other portions of a data packet.

In accordance with an illustrative embodiment, functionality provided in node 608 to mark a percentage of data packets 612 may include functionality for marking packets according to some defined continuous measure of congestion. Alternatively, packets may be marked in accordance a discrete number of congestion categories or levels. The percentage of packets marked may be the midpoint between thresholds bracketing a particular congestion category. For example, three congestion categories may be defined by two threshold levels corresponding, for example, to 33% congestion and 67% congestion. The category of 0% to 33% congestion may be classified as no congestion. The category of 34% to 67% congestion may be classified as "medium" congestion. The category of 68% to 100% congestion may be classified as "heavy" congestion. In this case, 0% of packets may be marked under conditions of no congestion, 50% of packets may be marked under conditions of medium congestion, and 100% of the packets may be marked under conditions of heavy congestion. This marking scheme provides a maximum difference between the marked percentage and the nearest threshold, enabling faster determination of the current congestion category by examining packets over a short time window.

In the previous example, the congestion categories each cover percentage ranges of congestion that are approximately equal in size. In other embodiments, congestion categories may be used that cover various ranges of congestion that are not equal in size. For example, four congestion categories may be used, wherein 0% of packets are marked under conditions of no congestion, 33% of packets are marked under conditions of light congestion, 67% of packets are marked under conditions of medium congestion, and 100% of packets are marked under conditions of heavy congestion. For this example, thresholds of 17% congestion, 50% congestion, and 83% congestion may be established to distinguish between no congestion and medium congestion, between light and medium congestion, and between medium and heavy congestion, respectively.

In general, any number of congestion ranges or levels, in any combination of any sizes, and defined by any combination of any thresholds, may be used for determining any corresponding percentage of packets to be marked to indicate a level of congestion in accordance with illustrative embodiments. If a marking period is used to determine a percentage of packets to be marked, congestion thresholds defining different levels or categories of congestion may need to be approximate, depending on the length of the marking period.

Network node 608 may use pseudo-random number generator 616 to determine which individual packets to mark during the marking period defined by timer 614. When header compression is to be used as the behavior response to an indication of congestion, as will be discussed in more detail below, it may be desirable to have all of the data packets that are marked "Congestion Experienced" transmitted consecutively, followed and preceded by the non-marked packets. A repeating pattern of non-marked packets alternating with marked packets may be used. Such a pattern is the most efficient approach in terms of compression. The receiving user equipment 604 that will measure the percentage of marked packets may be informed of the period of this repeating pattern, such as communicated via a Session Description Protocol parameter at call setup or as a parameter of an Open Mobile Alliance Device Management (OMA DM) object. Alternatively, the period of the repeating pattern may be detected by transitions from marked to non-marked packets and vice versa. If, over some maximum period, a transition is not detected, then it may be assumed that either all of the packets are marked or none of the packets are marked. The period of the pattern, the "congestion experienced" marking period, may either be an integer value equal to a number of packets or may be a time value. A default value may be specified in case the marking period is not configured in user equipment 604.

Data packets, including marked and unmarked packets, are transmitted 618 via wireless communication channel 606 to user equipment 604 in a normal manner. Similarly, user equipment 604 receives the data packets from network 602 in a normal manner.

In accordance with an illustrative embodiment, user equipment 604 includes congestion response module 622. Functions of congestion response module 622, to be described in more detail below, may be implemented in software, firmware, or the like, operating on the main processor or another processor provided in user equipment 604. Functions of congestion response module 622 include functions to determine congestion from the data packets 624 received by user equipment 604 and functions to implement congestion response behavior 626 in response to the determined congestion.

In accordance with an illustrative embodiment, level 628 of congestion is determined by determining a percentage of marked packets. User equipment 604 may determine the percentage of marked packets either continuously or periodically. If the percentage of marked packets is determined periodically, the period between determinations may be varied based on congestion conditions.

Timer 630 may be used to establish the length of a window of time over which the percentage of data packets marked "Congestion Experienced" is determined. A default window length may be specified. Alternatively, this window also may be customized and, for example, downloaded as part of a management object. A longer window would give more accuracy and resolution in terms of measuring the percentage of marked packets. A shorter window would give better adaptability to changes in congestion conditions.

Instead of using timer 630 and a time window, an equation that takes into account the latest packet marking and a previous estimate of marked packet percentage may be used to determine the percentage of data packets marked "Congestion Experienced". An example of such an equation is presented as Equation 1:

$$\text{new\_estimate} = \alpha * (\text{current\_packet\_marked}) + (1-\alpha) * (\text{previous\_estimate}),  \quad \text{Equation 1}$$

where current_packet_marked is equal to 1 if the current data packet is marked as "Congestion Experienced" and 0 otherwise, and previous_estimate is the estimate of the percentage of packets marked taking into account all packets received prior to the current packet.

The value of $\alpha$ is selected such that $0 \leq \alpha \leq 1$. The value of $\alpha$ may be selected to be a small value, such as 0.02, to provide for slow adaptation of the determined percentage of marked packets in response to a change in the percentage of marked packets. A large value for $\alpha$, such as 0.9, in contrast, would provide for rapid adaptation of the determined percentage of marked packets in response to a change in the percentage of marked packets. An appropriate value for $\alpha$ may be determined in terms of providing a desired balance between adapting quickly to changing congestion decisions and resolution.

Having determined level 628 of congestion, rules 632 are applied to determine the appropriate congestion response behavior 626 to be implemented in response to the determined level of congestion. In accordance with an illustrative embodiment, rules 632 may include various thresholds 634 to which the determined level of congestion is compared in order to determine the appropriate congestion response behavior. If the percentage of packets marked "Congestion Experienced" received over a specified period of time is above a given threshold 634, then a specific response behavior may be triggered. As will be discussed in more detail below, such behavior change may include one or more of codec selection 636, mode selection 638 in the case where the current codec supports multiple modes, rate adaptation 640, frame aggregation 642 to change the number of frames per packet, changing the amount of redundancy 644, compressing packet headers 646, any other appropriate method for responding to the determined level of network congestion.

Thresholds 634 employed to determine congestion response behavior 626 may include default values 648 with corresponding default behavior. Such default thresholds 648 may be pre-programmed. Alternatively, thresholds 634 may be customized 650 according to some priority measure or operator preferences. For example, premium subscribers, emergency callers, or the like, may employ threshold level values and corresponding response behaviors that are different from those used in other user equipment that does not have such priority. Custom thresholds 650 may be downloaded into user equipment 604 over the air, such as by using an Open Mobile Alliance Device Management (OMA DM) object. Alternatively, the network node 608 could inject customized thresholds 650 into the Session Description Protocol (SDP) information at call setup. As another alternative, thresholds 634 and/or parameters specifying user equipment 604 behavior at the various threshold levels may always be downloaded or determined at setup.

Examples of thresholds and corresponding behavior in accordance with illustrative embodiments are presented in FIGS. 7 and 8. In these examples, the threshold levels are defined in terms of the proportion of data packets that are marked "Congestion Experienced". In these examples, the corresponding sender behavior at each threshold level is presented in terms of a change to the rate within a set of codec rates currently in use. Note that the example thresholds and behaviors presented in FIG. 8 provide for both decreasing and increasing the codec rate depending upon the threshold level of congestion indicated by the proportion of marked packets.

Congestion level thresholds 634, and corresponding congestion response behaviors, may be customized and defined with respect to a particular codec being used. For example, if Adaptive Multi Rate is the negotiated codec established at startup, seven thresholds of 14%, 28%, 42%, 56%, 70% and 84% may be used to determine the maximum bitrate allowed according to the determined percentage of packets marked. Thus, for example, for users of a particular priority class, the table presented in FIG. 9 may be used to determine the maximum bitrate for various threshold levels of congestion as determined from the percentage of marked packets. Different threshold levels and/or different behaviors at different threshold levels from those illustrated by example in FIGS. 7, 8 and 9, including behaviors for reducing congestion other than by changing the codec rate, may be employed.

In accordance with an illustrative embodiment, the rate of congestion change 652 or derivatives of this rate also may be calculated and may be used to specify the user equipment behavior. The table presented in FIG. 10 illustrates one example of how the user equipment bitrate may be adapted in accordance with an illustrative embodiment based on both determined congestion levels and determined rates of change in the congestion levels. As illustrated, in accordance with this embodiment, the codec rate may be decreased more rapidly in response to a more rapid detected increase in the level of congestion. Similarly, the codec rate may be increased more rapidly in response to a more rapid detected decrease in the level of congestion.

Specific examples of congestion response behavior 626 in response to detected congestion levels in accordance with an illustrative embodiment now will be presented. Consider the case where the Adaptive Multirate codec with a mode set corresponding to the bitrates 12.2 kbps, 7.4 kbps, 5.9 kbps, and 4.75 kbps has been negotiated at call setup. In this example, suppose that the user equipment employs two thresholds levels to distinguish three congestion levels or categories. If, for example, the user equipment detects packets marked "Congestion Experienced", but the determined percentage of such packets is less than 33% over some specified time interval, then the congestion level is determined to be "light". If, for example, between 33% and 67% of the packets are determined to be marked, congestion is considered to be "moderate". If over 67% of the packets are determined to be marked, congestion is determined to be "heavy".

Assume that the sender is currently encoding with the 12.2 kbps rate and light congestion is determined from the percentage of marked packets. In this case, the sender may adapt to the next lower bitrate of 7.4 kbps. If the sender were encoding with the 12.2 kbps bitrate, and moderate congestion were determined from the percentage of marked packets, then the sender may adapt immediately to the lower 5.9 kbps bitrate. If the sender were restricted to change modes to neighboring rates according to the "mode-change-neighbor" mode at call setup, then the sender would change first to the 7.4 kbps bitrate and then to the 5.9 kbps bitrate at the next opportunity when moderate congestion is determined. Finally, if the sender were encoding with the 12.2 kbps bitrate and heavy congestion were determined from the percentage of marked packets, then the sender may adapt its bitrate down to the 4.75 kbps bitrate either immediately, or through the two intermediate modes first if mode changes are restricted to intermediate modes.

If congestion eases to a lower level or category of congestion, the codec bitrate may then be increased. This increase preferably may be controlled by delay timer 654 providing a randomized time delay for the increase to avoid unintended synchronization between senders performing an increase in the codec rate due to congestion easing. Use of the random timer 654 thus operates to prevent oscillation 656. Without randomization, some oscillation between lower and higher levels of congestion could occur as the bitrate for multiple senders is increased simultaneously in response to a lower level of network congestion.

As another example of congestion response behavior, the percentage of packets marked "Congestion Experienced" also may be used to limit the modes of speech codec 658 to a subset of the mode set and/or to limit the bitrate for video in a video codec 660 to a percentage of the full bitrate. For example, if no speech packets are marked over a defined marking period, then the receiver may request that any codec mode of the sender may be used. When marked packets are first detected, if the sender is using the highest mode, then the receiver may immediately request a reduction to the next lower mode. The receiver would also begin measuring the percentage of marked packets when marked packets are first detected. If the percentage of marked packets is between 0% and 10%, the receiver would not request that the highest mode of the sender be used. If the percentage of marked packets is greater than 20%, but less than 50%, then the receiver would request that the sender use a mode other than one of the two highest modes, assuming that there are at least three modes in the mode set. If the percentage of marked packets is greater than 50%, then the receiver may request that the sender use the lowest mode in the mode set. Different percentages, mode subsets, and combinations thereof from those presented in this example may be used in accordance with illustrative embodiments.

As another specific example of congestion response behavior, in the context of video data transmission, if no video packets are marked "Congestion Experienced" over the defined marking period, then the receiver may request a maximum video rate. When marked packets are first detected, and the sender is using the maximum bitrate, then the receiver could immediately request a reduction of 10% in the bitrate. The receiver would also begin measuring the percentage of marked packets when marked packets are first detected. If the percentage of marked packets is between 0% and 10%, the receiver may not request that a bitrate above 90% of a maximum bitrate be used. When the percentage of marked packets is greater than 20%, but less than 50%, then the receiver might not request that a bitrate above 80% of a maximum bitrate be used. If the percentage of marked packets is greater than 50%, then the receiver may not request a bitrate above 50% of a maximum bitrate. Different percentages from those presented in this example may be used in accordance with illustrative embodiments.

In the previous examples, the bitrate reductions in response to detecting different percentages of marked packets may be made relative to the current rate. For example, with speech, when marked packets are first detected, the mode may be reduced automatically to the next lower mode relative to the current mode. With this modification, all senders would reduce their rate, assuming that they are not at the lowest rate, and the rate decreases are relative to the rate when marked packets are first detected. Similarly, for video packets, the reduction in rate in response to detecting increasing levels of congestion may be made relative to the current rate. The receiver may periodically measure the percentage of marked packets and adjust the rate accordingly. The thresholds used should be far enough apart, relative to the granularity of the estimates, so that there is no oscillation between rate requests.

As a further example of congestion response behavior, in addition to using the percentage of packets marked "Congestion Experienced" to limit the bitrate of a selected codec, the percentage of marked packets may also be used in codec selection and/or to determine a set of rates to be used with a multirate codec. For example, if the percentage of marked packets indicates that there is already a certain level of congestion on network 602, it may be better to select a codec that is not very limited in terms of supported data rates. If Adaptive Multirate were being used, for example, a mode set that provides a wide range of bitrates may be selected when a certain level of congestion is indicated.

In accordance with an illustrative embodiment, congestion response behavior 626 of a sender, such as user equipment 604, to a determined level of network congestion may be overridden or adjusted by a module or functionality that takes into consideration priorities 658, including emergencies. If the sender is a priority user, or a call is an emergency call, then congestion response behavior 626 may call for a behavior that is different from the case where the sender or call is not a priority. For example, in the example presented above, if the sender is a priority, or the call is an emergency call, congestion response behavior 626 may call for no change in the bitrate in response to a determination of light congestion. As congestion increases to higher levels, even priority users may want to reduce the sending rate, as the danger of dropping packets and reducing performance increases. Congestion response behavior 626 for various priorities at various levels of congestion may be a user decision. For example, a management object may be downloaded into user equipment 604 that specifies congestion response behavior 626 for users with given priorities. Users with different priorities may have different defined behaviors and/or different congestion threshold levels 634 at which those behaviors are implemented. The number of thresholds 634 in use also may be established by the network operator. For example, instead of having three simple classifications of congestion, light, moderate, and heavy, as in the example presented above, an individual operator may distinguish as many categories as desired.

The illustration of FIG. 6 is not meant to imply physical or architectural limitations to the manner in which different embodiments may be implemented. Other components in addition and/or in place of the ones illustrated may be used. Some components may be unnecessary in some embodiments. Also, the blocks are presented to illustrate some functional components. One or more of these blocks may be combined and/or divided into different blocks when implemented in different advantageous embodiments.

For example, the functional components of determining a congestion level 624 and determining congestion response behavior 626 may involve various calculations. The illustration of FIG. 6 suggests that all such calculations are performed in user equipment 604. However, some or all of such calculations may be performed in one or more nodes 608 of network 602. For example, network 602 may calculate the level of congestion and the desired response behavior of user equipment 604 and merely transmit an indication of the desired response to user equipment 604. Also, in previous examples, a receiver has measured a percentage of marked packets and, according to thresholds, has requested the appropriate rate or other behavior from the sender. Alternatively, the receiver may report on the marked packets to the sender, and the sender then may perform calculations to determine its own sending rate. In any case, it is preferred that as many calculations as possible be performed at user equipment 604, since performing calculations at network 602 can only add to network congestion.

Controlling congestion response behavior in response to a detected percentage of marked packets in accordance with an illustrative embodiment also may be applied in certain cases where packets are not intentionally marked to indicate a level of congestion. For example, as discussed above, where binary marking is used to indicate congestion, packets are marked when congestion is detected, and not marked when congestion is not detected. In a binary marking scheme, the percentage of marked packets is not related to the level of congestion. In most cases, in a binary marking scheme, either 0% or 100% of packets are marked. However, at times when the level of congestion is close to a boundary between congestion and no congestion, packets will be both marked and unmarked as conditions waver between congestion and no congestion. During these times, the percentage of packets marked could be determined and could be used to smooth or stabilize congestion behavior. For example, in accordance with an illustrative embodiment, a percentage of marked packets rising above a certain threshold could be used to trigger a rate reduction in order to control congestion even in cases where packet marking to indicate congestion is only binary.

As a more specific example, during codec rate adaptation in response to the detection of congestion in a binary marking scheme, if the condition of the network congestion is removed due to less traffic, so there are no more marked packets, over time the codec rate used may be gradually increased up to the maximum value allowed within the negotiated codec rates. As a result of the gradually increasing codec rate, the network could experience congestion again and restart packet marking. In this case, the sender and receiver may oscillate between two codec rates in the negotiated or specified code set. To stabilize such binary marking based codec rate adaptation for network congestion control, the percentage of marked packets received over a certain period may be determined and a codec rate reduction initiated only if the percentage exceeds a threshold level. In this case, the marking percent threshold is used to determine a point for starting or continuing a codec rate adaptation using binary marked packets that will result in more stable congestion control.

The flowchart of FIG. 11 illustrates an example method 1100 for marking a percentage of data packets to indicate a level of congestion in accordance with an illustrative embodiment. Method 1100 may be implemented in one or more nodes of a communication network, such as node 608 of network 602 as illustrated in FIG. 6.

Method 1100 includes first determining a level of congestion (step 1110). Step 1110 may include any method currently known, or which becomes known, for determining a congestion level. In particular, step 1110 preferably may include determining a congestion level at a node or at any other location in a network that may affect processing by the network of data packets to be delivered to or received from user equipment, as described above.

A percentage of data packets is marked to indicate the determined level of congestion (step 1120). Step 1120 may include marking a percentage of packets to be transmitted over a defined marking period based on a determined level of congestion for that period. Step 1120 may include marking either the header or another portion of a data packet with a marker indicating "Congestion Experienced". For example, a marking scheme currently used or proposed for Explicit Congestion Notification, such as marking two bits in the Internet Protocol (IP) header of a packet as '11', may be used to mark the packet. A pseudo random number generator may be used to select which individual packets in the marking period are to be marked, or another method for selecting which individual packets are to be marked may be used. Step 1120 may include marking packets according to some defined continuous measure of congestion or based on a discrete number of congestion levels or categories.

The data packets, including marked and unmarked packets, are transmitted in a normal manner (step 1130). The steps of method 1100 may be repeated, either continuously or periodically.

The flowchart of FIG. 12 illustrates an example method 1200 for changing the behavior of user equipment in response to a determined level of network congestion as indicated by a percentage of marked data packets. Method 1200 may be implemented in user equipment, such as user equipment 604 as illustrated in FIG. 6. Alternatively, one or more steps, portions of steps, or calculations performed for the steps of method 1200 may be performed in one or more network nodes, such as node 608 of network 602 as illustrated in FIG. 6, with the results thereof transmitted to user equipment for appropriate implementation. However, it is preferred that the steps of method 1200 be performed by the affected user equipment, since performing such steps in other network nodes can only increase network congestion.

Method 1200 includes receiving data packets in a normal manner (step 1202). Step 1102 includes receiving both marked and unmarked data packets. A percentage of the received packets that are marked is determined (step 1204). Step 1204 may include determining the percentage of marked packets over a time window or using an equation, such as Equation 1, that takes into account the marking of the most recent packet and a previous estimate of the marked packet percentage. In accordance with an illustrative embodiment, the percentage of packets that are marked indicates a level of network congestion.

The determined percentage of marked packets is compared to a threshold (step 1206). Step 1206 may include comparing the determined percentage of marked packets to various ranges of threshold values, wherein each range of threshold values includes a corresponding user equipment congestion response behavior. The comparison of the determined marked packet percentage to the threshold values results in a decision whether or not a behavior change is indicated (step 1208). If behavior change is indicated, a check may be made to determine whether a priority condition indicates that the behavior change should be overridden (step 12110). If there is no priority override, the behavior change may be implemented to change the user equipment transmission behavior in response to the determined level of congestion (step 1212). If no behavior change is indicated at step 1208, or a priority override is indicated at step 1210, no change to the transmission behavior may be made. Method 1200 may be repeated either continuously or periodically.

Figure 13A:
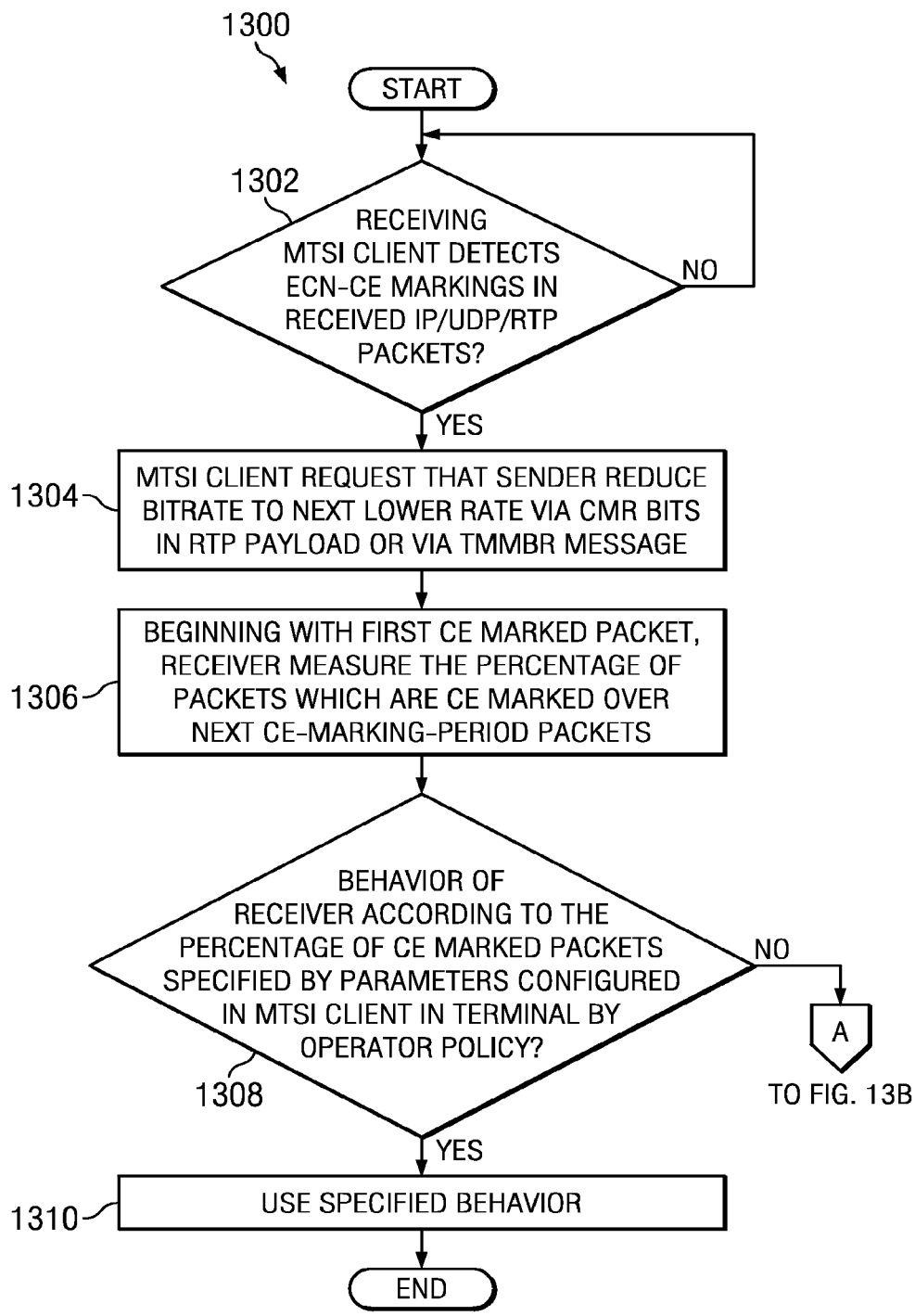
FIG. 13A and FIG. 13B are flowcharts of a method of responding to congestion in speech data in a communication system in accordance with an illustrative embodiment.
Figure 13B:
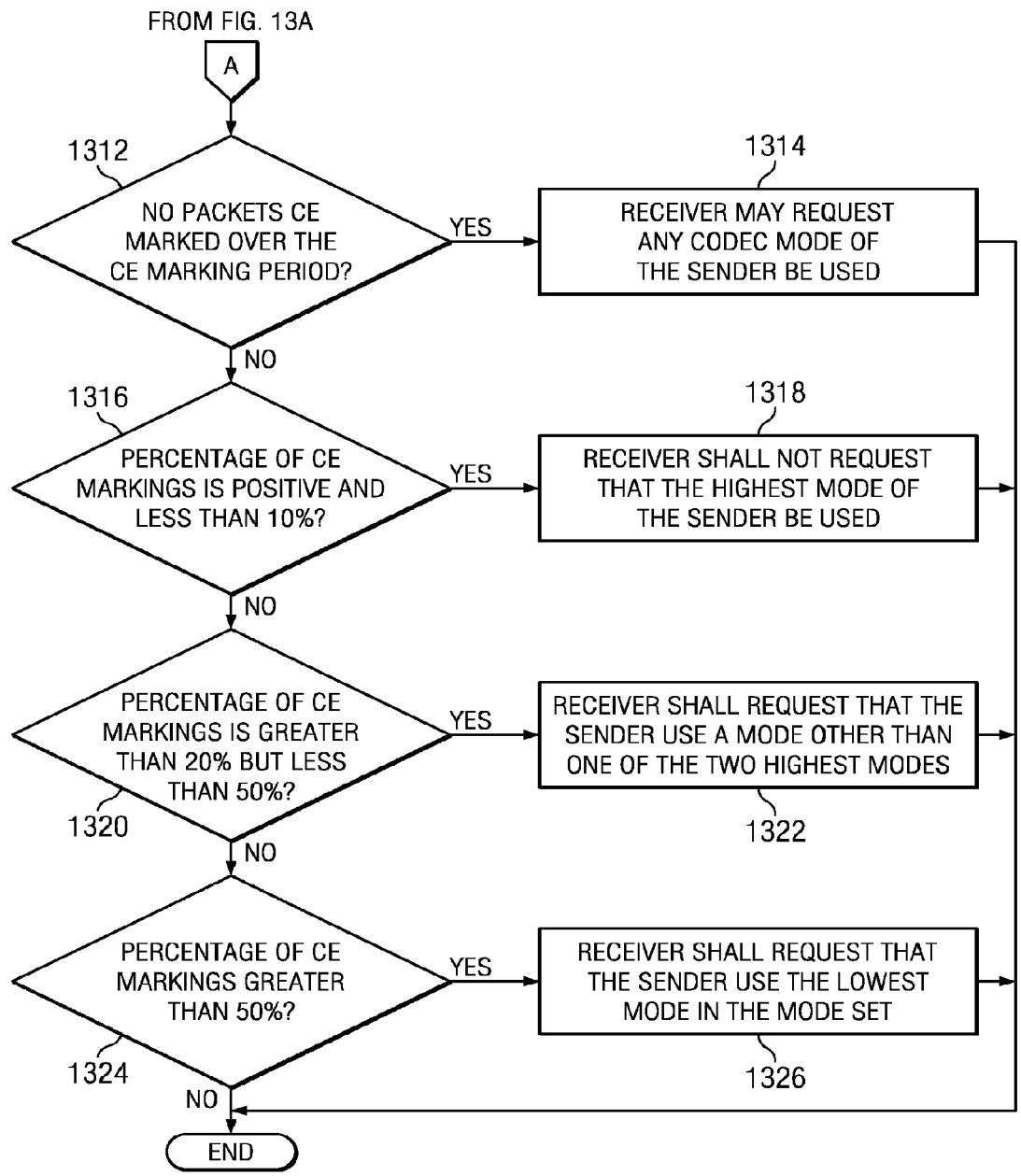

The flowchart of FIGS. 13A and 13B illustrates a method for handling congestion in speech data in communication network in accordance with an illustrative embodiment. In this example, and the one that follows, adaptation to changing congestion conditions is controlled by a set of parameters. These parameters may be configured into a Multimedia Telephony Services for IP Multimedia Subsystem (MTSI) client based on operator policy, for example, using Open Mobile Alliance-Device Management (OMA-DM). When the network supports Explicit Congestion Notification (ECN), the percentage of packets that are marked "Congestion Experienced" (CE) can be used as an indication by the network to the MTSI client in terminal of the degree of congestion on the network. In this case, the network will mark a repeating pattern of consecutive CE marked packets followed by consecutive unmarked packets. The period of this repeating pattern is one of the parameters which can be configured based on operator policy. This parameter is referred to as CE-marking-period. CE-marking-period is an integer representing a number of packets. It should be large enough so that if there is some packet loss a reasonable estimate of the number of packets lost can still be made. If no CE-marking-period is configured, then a default value of 50 may be used.

It is determined whether a receiving MTSI client in terminal that supports and has negotiated ECN detects ECN-CE markings in received Internet Protocol/User Datagram Protocol/Real-time Transport Protocol (IP/UDP/RTP) packets (step 1302). If CE marked packets are detected, then the MTSI client in terminal immediately requests that the sender reduce its bitrate to the next lower rate (step 1304). Step 1304 includes notifying the sender via the Codec Mode Request (CMR) bits in the RTP payload, if supported by the codec, and via a Temporary Maximum Media Stream Bit Rate Request (TMMBR) message if the RTP payload for the codec does not support a CMR field. Beginning with the first CE marked packet, the receiver measures the percentage of packets which are CE marked over the next CE-marking-period packets (step 1306). It is determined whether the behavior of the receiver according to the percentage of marked packets is specified by parameters configured in the MTSI client in terminal by operator policy, for example by OMA DM (step 1308). If the behavior is specified, the behavior of the receiver according to the percentage of marked packets is used (step 1310). If no behavior is configured in the user equipment (UE), then default behavior is used.

It is determined whether no packets are marked over the CE-marking-period (step 1312). If no packets are marked, then the receiver may request any codec mode of the sender be used (step 1314). It is determined whether the percentage of CE markings is positive and less than 10% (step 1316). If this is the case, then the receiver will not request that the highest mode of the sender be used (step 1318). It is determined whether the percentage of CE markings is greater than 20% but less than 50% (step 1320). In this case, the receiver requests that the sender use a mode other than one of the two highest modes, assuming there are at least three modes in the mode-set (step 1322). It is determined whether the percentage of CE markings is greater than 50% (step 1324). If this is the case, the receiver requests that the sender use the lowest mode in the mode-set (step 1326).

Figure 14A:
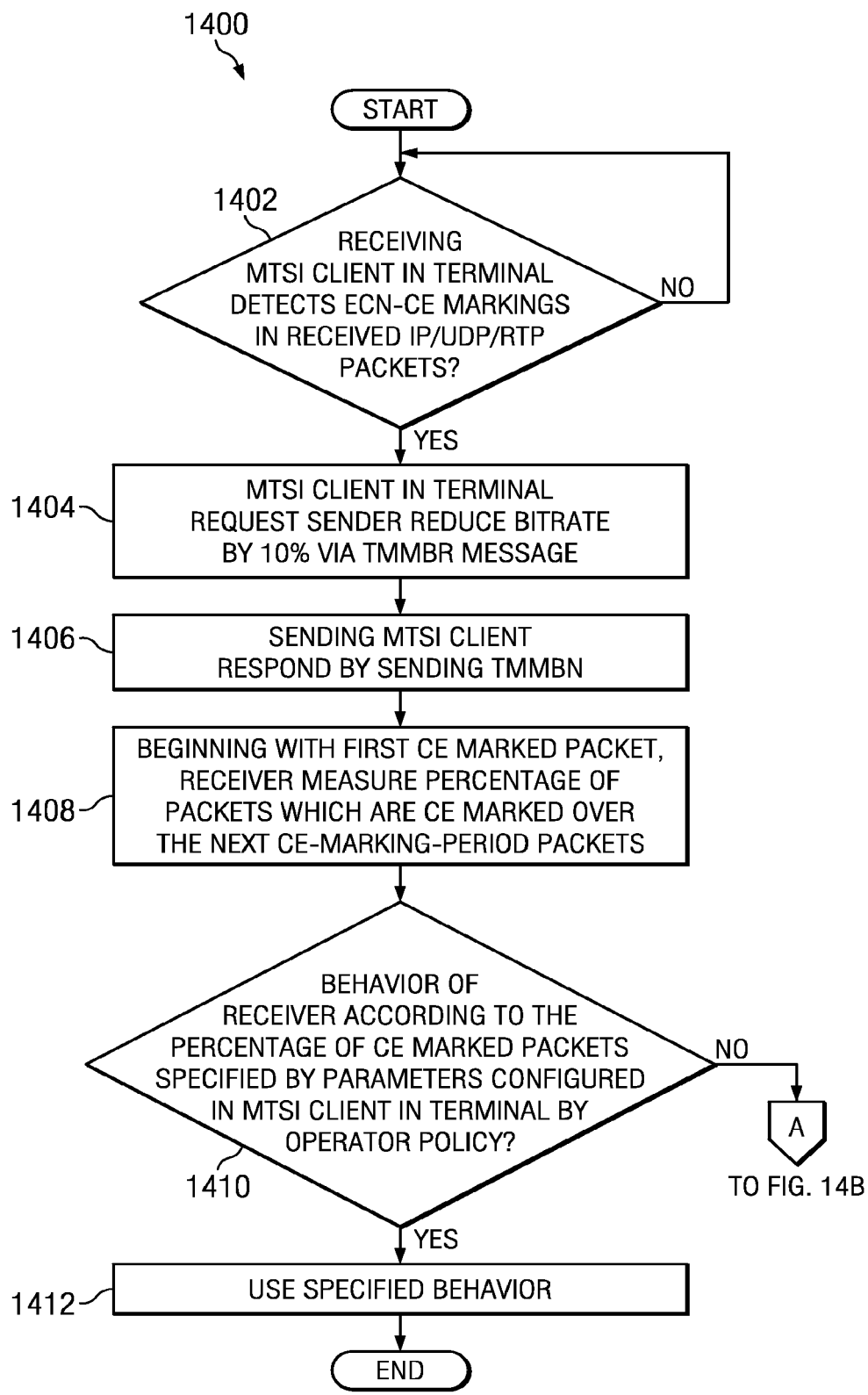
FIG. 14A and FIG. 14B are flowcharts of a method of responding to congestion in video data in a communication system in accordance with an illustrative embodiment.
Figure 14B:
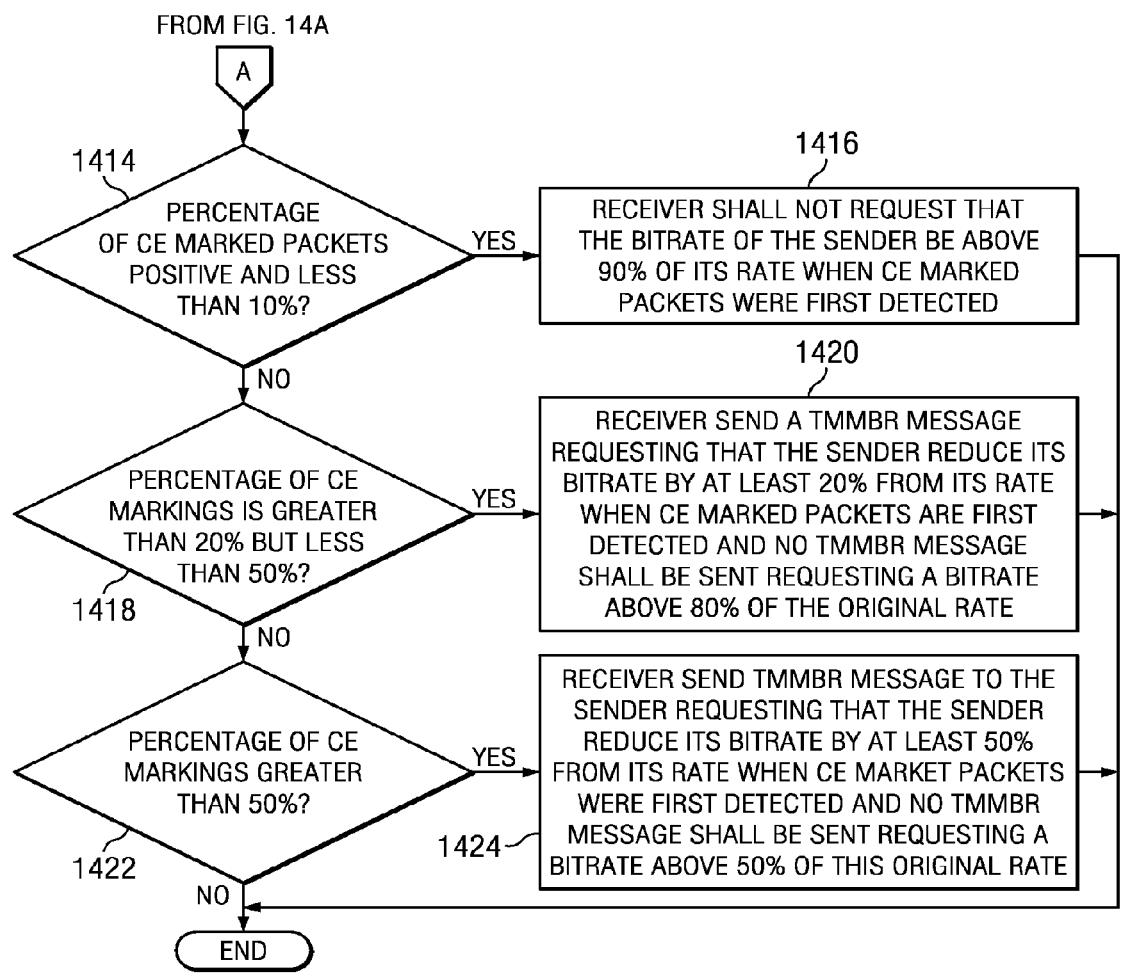

The flowchart of FIGS. 14A and 14B illustrates a method for handling congestion in video data in a communication network in accordance with an illustrative embodiment. It is determined whether a receiving MTSI client in terminal that supports and has negotiated ECN detects ECN-CE markings in received IP/UDP/RTP packets (step 1402). If marked packets are detected, the MTSI client in terminal immediately requests that the sender reduce its bitrate by 10% via a TMMBR message (step 1404). The sending MTSI client responds by sending TMMBN (step 1406). Beginning with the first CE marked packet, the receiver measures the percentage of packets that are CE marked over the next CE-marking-period packets (step 1408). It is determined whether the behavior of the receiver according to the percentage of CE marked packets is specified by parameters configured in the MTSI client in terminal by operator policy, for example by OMA DM (step 1410). If behavior is specified, the specified behavior of the receiver according to the percentage of CE marked packets is used (step 1412). If no behavior is configured in the UE, then default behavior is used.

It is determined if the percentage of CE markings is positive and less than 10% (step 1414). In this case, the receiver will not request that the bitrate of the sender be above 90% of its rate when CE marked packets were first detected (step 1416). It is determined whether the percentage of CE marked packets is greater than 20% but less than 50% (step 1418). If this is the case, the receiver sends a TMMBR message requesting that that the sender reduce its bitrate by at least 20% from its rate CE marked packets are first detected and no TMMBR message will be sent requesting a bitrate above 80% of this original rate (step 1420). It is determined whether the percentage of CE markings is greater than 50% (step 1422). If this is the case, then the receiver sends a TMMBR message to the sender requesting that the sender reduce its bitrate by at least 50% from its rate when CE marked packets were first detected and not TMMBR message shall be sent requesting a bitrate above 50% of the original rate (step 1424).

One or more of the disclosed embodiments provides a capability to determine a level of congestion in a communication system and to indicate the determined level of congestion by marking a percentage of data packets transmitted by the system. The percentage of data packets so marked corresponds to, and thus indicates, the level of congestion. User equipment receiving the data packets thus may determine the level of congestion based on the percentage of marked packets. The behavior of the user equipment thus may be more intelligently and effectively determined than if a simple binary indication of congestion were provided. For example, the bitrate of the user equipment may be adjusted by an appropriate amount and in an appropriate manner based on the determined level of congestion. Unnecessarily large reductions in the bitrate in response to relatively low levels of congestion thus may be avoided, for example.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or to limit the embodiments to the form disclosed. Many modifications and variations will be apparent to those of ordinary skill in the art. In the illustrative examples, the user equipment has been described with respect to a mobile phone. The different illustrative embodiments may be applied to other types of platforms in addition to or in place of the ones described, such as a mobile platform, a stationary platform, a land-based structure, an aquatic-based structure, a space-based structure, a smart phone, a personal digital assistant, a desktop computer, a server computer, a set-top box, a game console, a workstation, and any other suitable platform. A component may be included in a platform in a number of different ways. For example, the component may be located inside the platform, outside of the platform, formed as part of the platform, mechanically secured to the platform, or otherwise associated with the platform.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for responding to network congestion, comprising:
   receiving, by a receiver in a network, a plurality of data packets at a first bitrate, wherein the plurality of data packets include media encoded by a sender in the network, wherein the plurality of data packets are transmitted on a communication channel from the sender to a network node in the network and from the network node to the receiver, and wherein the communication channel carries a call between the sender and the receiver;
   determining, by the receiver, a percentage of the plurality of data packets that are received by the receiver during a time window and that were previously marked by the network node with a congestion indicator;
   selecting, by the receiver, based on the determined percentage of the data packets that are received during the time window and marked with the congestion indicator, a second bitrate, wherein the second bitrate is different from the first bitrate; and
   transmitting, by the receiver, a request for the sender to encode the media at the second bitrate and for the sender to transmit the encoded media over the communication channel.

2. The method of claim 1, wherein the steps of determining and transmitting are performed by a processor programmed by instructions stored in a memory coupled with the processor, the method further comprising selecting a value for the second bitrate based on a comparison between the determined percentage and a predetermined threshold.

3. The method of claim 1, wherein the steps of determining and transmitting are performed by a processor programmed by instructions stored in a memory coupled with the processor, the method further comprising selecting a different value for the second bitrate when the determined percentage is above a first predetermined threshold than when the determined percentage is below the first predetermined threshold.

4. The method of claim 1, wherein the steps of determining and transmitting are performed by a processor programmed by instructions stored in a memory coupled with the processor, the method further comprising selecting a greater value for the second bitrate when the determined percentage is above a first predetermined threshold and below a second predetermined threshold than when the determined percentage is above the first predetermined threshold and above the second predetermined threshold.

5. The method of claim 1, wherein the step of selecting the second bitrate comprises selecting the second bitrate from a mode set negotiated at setup of the call between the sender and the receiver.

6. The method of claim 1, wherein the sender of the data packets comprises a first user equipment device, and wherein the steps of determining, selecting and transmitting are performed by a second user equipment device.

7. The method of claim 1, further comprising determining whether the sender is designated as being one of a priority sender or an emergency sender.

8. A device, comprising:
a memory; and
a processor coupled with the memory and configured by instructions stored in the memory such that the device:
receives a plurality of data packets at a first bitrate, wherein the plurality of data packets include media encoded by a sender in a network with the device, wherein the plurality of data packets are transmitted on a communication channel from the sender to a network node in the network and from the network node to the device, and wherein the communication channel carries a call between the sender and the receiver;
determines a percentage of the plurality of data packets that are received during a time window and that were previously marked with a congestion indicator by the network node;
selects, based on the determined percentage of the data packets that are received during the time window and marked with the congestion indicator, a second bitrate, wherein the second bitrate is different from the first bitrate; and
transmits a request for the sender to encode the media at the second bitrate and for the sender to transmit the encoded media over the communication channel.

9. The device of claim 8, where the processor is further configured by the instructions to select a value for the second bitrate based on a comparison between the determined percentage and a predetermined threshold.

10. The device of claim 8, where the processor is further configured by the instructions to select a different value for the second bitrate when the determined percentage is above a first predetermined threshold than when the determined percentage is below the first predetermined threshold.

11. The device of claim 8, where the processor is further configured by the instructions to select a greater value for the second bitrate when the determined percentage is above a first predetermined threshold and below a second predetermined threshold than when the determined percentage is above the first predetermined threshold and above the second predetermined threshold.

12. The device of claim 8, where the processor is further configured by the instructions to select the second bitrate from a mode set negotiated at setup of the call between the device and the sender.

13. The device of claim 8, wherein the sender of the data packets comprises a first user equipment device, and wherein the processor and memory are associated with a second user equipment device.

14. The device of claim 8, where the processor is further configured by the instructions to determine whether the sender is designated as being one of a priority sender or an emergency sender.

15. A non-transitory computer-readable medium with instructions stored thereon, wherein the instructions are executable by a processor to cause a device that includes the processor to perform the steps of:
receiving a plurality of data packets at a first bitrate, wherein the plurality of data packets include media encoded by a sender in a network with the device, wherein the plurality of data packets are transmitted on a communication channel from the sender to a network node in the network and from the network node to the device, and wherein the communication channel carries a call between the sender and the receiver;
determining a percentage of the plurality of data packets that are received during a time window and that were previously marked with a congestion indicator by the network node;
selecting, based on the determined percentage of the data packets that are received during the time window and marked with the congestion indicator, a second bitrate, wherein the second bitrate is different from the first bitrate; and
transmitting a request for the sender to encode the media at the second bitrate and for the sender to transmit the encoded media over the communication channel.

16. The non-transitory computer-readable medium of claim 15, wherein the instructions are further executable by the processor to cause the processor to perform the step of selecting a value for the second bitrate based on a comparison between the determined percentage and a predetermined threshold.

17. The non-transitory computer-readable medium of claim 15, wherein the instructions are further executable by the processor to cause the processor to perform the step of selecting a different value for the second bitrate when the determined percentage is above a first predetermined threshold than when the determined percentage is below the first predetermined threshold.

18. The non-transitory computer-readable medium of claim 15, wherein the instructions are further executable by the processor to cause the processor to perform the step of selecting a greater value for the second bitrate when the determined percentage is above a first predetermined threshold and below a second predetermined threshold than when the determined percentage is above the first predetermined threshold and above the second predetermined threshold.

19. The non-transitory computer-readable medium of claim 15, wherein the instructions are further executable by the processor to cause the processor to perform the step of selecting the second bitrate from a mode set negotiated at setup of the call between the device and the sender.

20. The non-transitory computer-readable medium of claim 15, wherein the instructions are further executable by the processor to cause the processor to perform the step of determining whether the sender is designated as being one of a priority sender or an emergency sender.

* * * * *